United States Patent [19]

Groll et al.

[11] 4,198,203
[45] Apr. 15, 1980

[54] DYESTUFF SOLUTIONS OF COPPER PHTHALOCYANINE DERIVATIVES FOR PAPER DYEING

[75] Inventors: Manfred Groll, Cologne; Friedhelm Müller, Odenthal, both of Fed. Rep. of Germany

[73] Assignee: Bayer Aktiengesellschaft, Leverkusen, Fed. Rep. of Germany

[21] Appl. No.: 901,093

[22] Filed: Apr. 28, 1978

[30] Foreign Application Priority Data

May 3, 1977 [DE] Fed. Rep. of Germany ....... 2719719

[51] Int. Cl.$^2$ .................. D21H 1/46; C09B 47/04; D21D 3/00; D21H 3/80
[52] U.S. Cl. ........................ 8/7; 8/1 XA; 260/314.5; 162/162
[58] Field of Search ............... 8/1 XA, 7; 260/314.5; 162/162

[56] References Cited

U.S. PATENT DOCUMENTS

| | | | |
|---|---|---|---|
| 3,365,463 | 1/1968 | Groll | 260/314.5 |
| 3,668,218 | 6/1972 | Von Tobel | 260/314.5 |
| 3,749,590 | 7/1973 | Thomas et al. | 106/288 Q |
| 3,754,958 | 8/1973 | Giambalvo | 106/288 Q |
| 3,764,360 | 10/1973 | Langley | 106/288 Q |
| 3,770,474 | 11/1973 | Langley et al. | 260/314.5 |
| 3,842,030 | 10/1974 | Maeda et al. | 260/314.5 |
| 3,891,455 | 6/1975 | Langley et al. | 106/288 Q |
| 3,951,678 | 4/1976 | Wanser | 106/288 Q |
| 3,960,587 | 6/1976 | Huille et al. | 106/288 Q |
| 3,994,872 | 11/1976 | Kuster | 260/314.5 |
| 4,036,585 | 7/1977 | James | 8/7 |
| 4,133,695 | 1/1979 | Wheeler | 260/314.5 |

Primary Examiner—Donald E. Czaja
Assistant Examiner—Maria S. Tungol
Attorney, Agent, or Firm—Sprung, Felfe, Horn, Lynch & Kramer

[57] ABSTRACT

Dyestuff solutions of

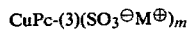

in which
CuPc denotes copper phthalocyanine,
m denotes a number from 1.8 to 2.5 and
$M^\oplus$ denotes a mixture of $A_n^\oplus$ and an amine of the formula

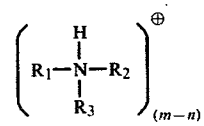

in which
n represents a number 0.8 to 1.5,
$A_n^\oplus$ represents an alkali metal ion or $NH_4$ ion,
$R_1$ and $R_2$ represent hydrogen, $C_1$-$C_4$-alkyl or $(CH_2—CH_2—O)_p$-H and
$R_3$ represents $—(CH_2—CH_2—O)_p$-H,
wherein
p denotes an integer from 1 to 6,
are suitable for dyeing paper in turquoise-colored shades.

4 Claims, No Drawings

DYESTUFF SOLUTIONS OF COPPER PHTHALOCYANINE DERIVATIVES FOR PAPER DYEING

The invention relates to dyestuff solutions of copper phthalocyaninesulphonic acids of the formula $$CuPc\text{-}(3)\text{-}(SO_3^\ominus M^\oplus)_m$$

in which
CuPc denotes copper phthalocyanine,
m denotes a number from 1.8 to 2.5 and
$M^\oplus$ denotes a mixture of $A_n^\oplus$ and an amine of the formula

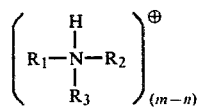

in which
n represents a number 0.8 to 1.5,
$A_n^\oplus$ represents an alkali metal ion or $NH_4$ ion,
$R_1$ and $R_2$ represent hydrogen, $C_1$–$C_4$-alkyl or $(CH_2$—$CH_2$—$O)_p$—H and
$R_3$ represents —$(CH_2$—$CH_2$—$O)_p$—H,
wherein
p denotes an integer from 1 to 6, are suitable for dyeing paper in turquoise-coloured shades, in water, which can contain up to 10% by weight of organic solvents, processes for the preparation of these solutions and their use for dyeing paper.

It is known that ready-to-use dyestuff solutions are increasingly being employed for dyeing paper since these solutions have considerable technical advantages over powder dyestuffs when dyeing paper. However, the demands made on the dyestuff solutions are high in respect of the dyestuff concentration, the storage stability and the suitability for use when making coloured papers; for example the electrolyte content of the solution should be as low as possible. These demands can frequently not be met or can be met only with considerable effort. This applies to a particular extent in the case of cyan to turquoise-coloured shades, which in general are obtained using copper phthalocyaninesulphonic acids.

The dyestuff solutions according to the invention meet the demands made on them particularly well. Moreover, they are technically simple to prepare and have a particularly low electrolyte content.

For the preparation, copper phthalocyanine is sulphonated in a conventional manner, statistically 1.8 to 2.5 sulphonic acid groups being introduced per molecule of copper phthalocyanine. The copper phthalocyanine sulphonation melt is discharged into a mixture of ice and water which contains 5 to 100 mols of an alkali metal salt or $NH_4$ salt per mol of sulphonated copper phthalocyanine. The copper phthalocyanine substituted by sulphonic acid groups precipitates as an acid salt in a form which is easy to isolate and is filtered off. The filter cake is washed substantially electrolyte-free with water, to which a little alkali metal salt and acid have been added, and reacted with water and an amine of the formula

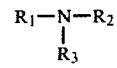

wherein
$R_1$, $R_2$ and $R_3$ and p have the abovementioned meaning, in the desired concentration to give a solution according to the invention.

The solutions according to the invention are outstandingly suitable for dyeing paper, both in the pulp and on the surface by the dyeing methods customary for this purpose.

EXAMPLE 1

29 g of copper phthalocyanine are stirred into 180 g of oleum having a $SO_3$ content of 38%, at 40° to 45° C. in the course of 3 to 4 hours. The mixture is then stirred at 50° C. until the copper phthalocyanine contains an average of 2.2 sulphonic acid groups per molecule. The sulphonation melt is then discharged into a mixture of 100 g of water, 100 g of potassium chloride and ice and the temperature of the resulting suspension is kept below 30° C. by adding further ice. The product is then filtered off and washed 6 times with a mixture of, in each case, 45 g of water, 2.5 g of potassium chloride and 3 g of 30% strength hydrochloric acid and then washed a further 3 times with a mixture of, in each case, 50 g of water and 1.5 . . . 30% strength hydrochloric acid.

The dyestuff which has been filtered off is stirred with 48 g of tris-[2-(2-hydroxyethoxy)-ethyl]-amine and, if necessary, the mixture is diluted to 200 g with water. This gives a concentrated dyestuff solution of the sulphonated copper phthalocyanine, which is especially suitable for dyeing paper.

Similarly concentrated dyestuff solutions are obtained when the amounts of potassium chloride indicated in paragraph 1 are replaced by the same amounts of sodium chloride, sodium sulphate or ammonium chloride or the amounts of 30% strength hydrochloric acid mentioned in the said paragraph are replaced by the same amounts of 60% strength sulphuric acid.

EXAMPLE 2

10 g of a 0.5% strength solution of the dyestuff liquid formulation according to Example 1, paragraph 2, are added, whilst stirring, to 200 g of a 2.5% strength paper pulp consisting of 50% of bleached pine sulphite and 50% of bleached birchwood sulphite and having a freeness of SR 35°. The pulp is then sized with 10 g of a 1% strength resin size solution and 20 g of a 1% strength aluminium sulphate solution and diluted with 500 g of water. After stirring for 15 minutes, the dyed paper pulp is poured onto a sheet former with a filter paper underlay and the liquid is sucked off. The paper sheet is couched between two sheets of filter paper and felts of equal size in a press and then dried on a hot cylinder at 100° C. for about 5 minutes. This gives a paper dyed brilliant turquoise.

EXAMPLE 3

10 g of the dyestuff liquid formulation obtained according to Example 1, paragraph 2, are stirred into a size press solution consisting of 50 g of cationic starch and 20 g of sizing agent (ABS polymer) and the raw paper or slightly sized paper is dyed at a throughput rate of about 5 to 7 m/minute at 20° C. and under a contact pressure of about 25% (Laboratory pad type, Messrs. W. Mathis, Niderhasli, Switzerland). Papers dyed uniformly brilliant turquoise are obtained.

We claim:

1. An aqueous solution of copper phthalocyaninesulphonic acids of the formula $$CuPc-(3)(SO_3^\ominus M^\oplus)_m$$

in which

CuPc denotes copper phthalocyanine, m denotes a number from 1.8 to 2.5 and $M^\oplus$ denotes a mixture of $A_n^\oplus$ and an amine of the formula $$\left( \begin{array}{c} H \\ | \\ R_1-N-R_2 \\ | \\ R_3 \end{array} \right)^\oplus_{(m-n)}$$

in which n represents a number 0.8 to 1.5, $A_n^\oplus$ represents an alkali metal ion or $NH_4$ ion, $R_1$ and $R_2$ represent hydrogen, $C_1$-$C_4$-alkyl or $(CH_2-CH_2-O)_p$—H and $R_3$ represents —$(CH_2-CH_2-O)_p$—H, wherein p denotes an integer from 1 to 6.

2. A process for the preparation of copper phthalocyanine sulphonic acid solutions according to claim 1, in which copper phthalocyanine containing 1.8 to 2.5 sulphonic acid groups per molecule, obtained by sulphonation, is discharged in the form of the sulphonation melt into a mixture of ice and water which contains 5 to 100 mols of an alkali metal salt or ammonium salt per mol of sulphonated copper phthalocyanine, the product is filtered off and the filter cake is reacted with water and an amine of the formula $$\begin{array}{c} R_1-N-R_2 \\ | \\ R_3 \end{array}$$

wherein $R_1$, $R_2$ and $R_3$ and p have the meaning indicated in claim 1.

3. The process of dyeing paper pulp or the surface of paper in which the dyestuff solution of claim 1 is used.

4. The aqueous solution of claim 1 consisting essentially of said copper phthalocyanine sulphonic acids, water and up to 10% by weight of organic solvents.

* * * * *